United States Patent [19]

Tymkewicz

[11] Patent Number: 5,107,793
[45] Date of Patent: Apr. 28, 1992

[54] SOUND CREATING TRAINING DEVICE

[76] Inventor: John Tymkewicz, 4159 W. Valley Dr., Fairview Park, Ohio 44126

[21] Appl. No.: 590,136

[22] Filed: Sep. 28, 1990

[51] Int. Cl.5 ............................................. A01K 15/02
[52] U.S. Cl. ..................................... 119/29; 231/2.1; 446/418
[58] Field of Search ................. 119/29, 136, 138, 153; 231/2.1; 273/84 R; 446/397, 418, 422

[56] References Cited

U.S. PATENT DOCUMENTS

| | | | |
|---|---|---|---|
| 2,103,401 | 12/1937 | Bailey | 231/2.1 |
| 2,643,638 | 6/1953 | Villmer | 119/153 |
| 2,987,317 | 6/1961 | Acevedo | 273/67 R |
| 3,221,444 | 12/1965 | Hettinga | 446/397 |
| 3,648,925 | 3/1972 | Fryer | 231/2.1 |
| 4,032,143 | 6/1977 | Mueller et al. | 273/72 R |
| 4,079,936 | 3/1978 | Schachter | 273/67 R |
| 4,328,966 | 5/1982 | Miyamoto | 273/67 R X |
| 4,690,404 | 9/1987 | Yoder | 446/418 X |

Primary Examiner—Robert P. Swiatek
Attorney, Agent, or Firm—Frank B. Robb

[57] ABSTRACT

A training device to create an attention getting sound by striking a surface with the device, the material from which the device is formed producing a relatively loud sound but without painful impact irrespective of the striking vigor.

3 Claims, 1 Drawing Sheet

SOUND CREATING TRAINING DEVICE

BACKGROUND OF THE INVENTION

As is well known, in the training of animals or in fact of children, the necessary preliminary action is to obtain the attention of that animal or individual.

It is thus obvious that if a sound can be created with little damage or in fact without pain, even by striking the individual, and at the same time creating a sound, the results of endeavors to train will be much more fruitful.

While the device hereof is primarily for training animals, it is obvious that the same principles apply in the training of anything else such as an individual.

In any event the primary purpose of this invention is to provide a device which will make a sharp sound, can be used to strike a dog or other animal without at the same time harming or hurting or in any way inflicting physical damage to that animal. At the same time the sound will be such that the attention of the animal is immediately obtained.

In fact the device is intended to provide an attention getting sound without even touching the animal by holding the device in one hand and striking the palm of the other hand, for example, or even another object with the device, the device itself creating the necessary sound and attention getting factor which is contemplated hereby.

GENERAL DESCRIPTION OF THE INVENTION

The invention hereof, is of a very simple nature, involving the use of a body comprising an elastic, closed cell, low density, low durometer, elongated cylindrical foam plastic of suitable composition and medium strength.

When formed by extrusion or molding, it will preferably have a smooth skin.

I have found that a piece of the material with a diameter of about ⅝ inch and about 24 inches in length, when formed into the ultimate desired form of body and furnished with a handle portion and an open loop, will effect the desired result.

This is accomplished by gripping the handle portion in one hand and striking the other hand for example, will produce a startlingly sharp sound and instantly draw the attention of one hearing the same.

In the concept of the invention hereinbefore outlined the same is disclosed in the drawing appended hereto as comprising a loop so to speak of this material which is formed so as to provide a handle and thereby making possible quite a loud sound upon impact when the device is used to strike some surface whether it be the hand of the user or some other area.

As will be understood from the drawing, FIG. 1 is a plan view of the device showing the body of the material is formed into a loop with a handle portion at one end.

DETAILED DESCRIPTION OF THE INVENTION

Figure 1:
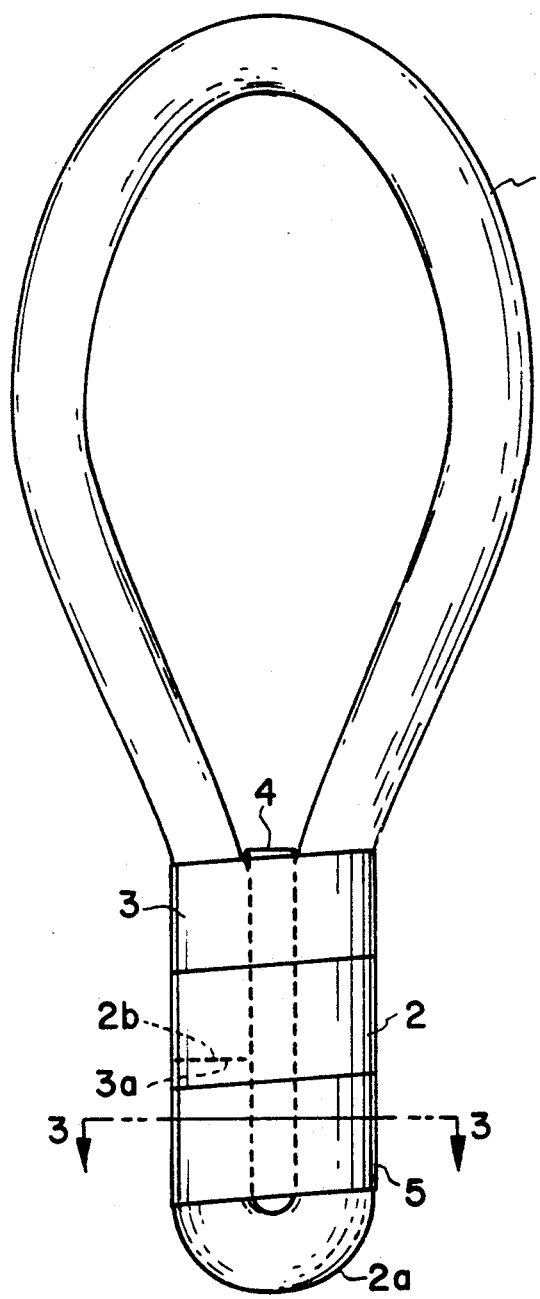
Figure 2:
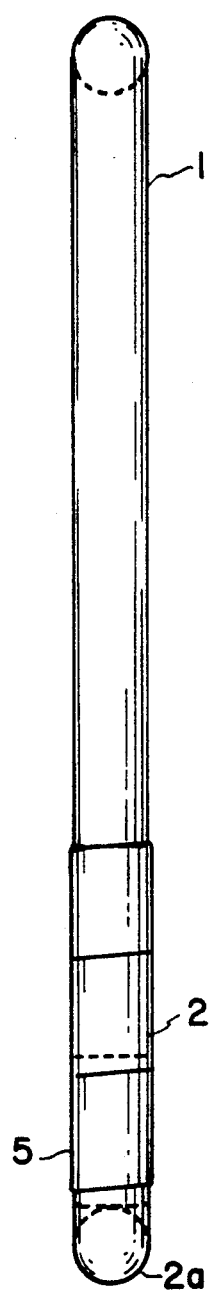
FIG. 2 is a side view of the device.
Figure 3:
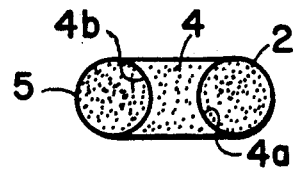
FIG. 3 is a sectional view taken about on the line 3—3 of FIG. 1 looking in the direction of the arrows to disclose the cross-section of the handle portion.

Turning now to a consideration of the drawing, it will be seen that the material of the body hereof is in effect folded or turned around on itself so that the body 1 will have the end 2 at 2a, turned back on itself so that the portion 2b is brought into alignment and close to the end 3a of the other end 3 of the body of the material to thereby provide the shape as shown in FIG. 3.

A spacer member 4, formed so as to extend along between the ends 2 and 3, and having the concave opposite sides 4a and 4b to conform with the inner portions of the ends 2 and 3, is inserted between the ends 2 and 3.

The ends 2 and 3 are fastened together with the spacer member therebetween by wrapping a wide adhesive reinforced tape 5 around them with one or two turns. This will maintain them together at the same time forming a handle for gripping the device by the user.

As will be understood, the body 1 is approximately ⅝ of an inch in diameter, although this is not critical and other shapes and sizes may also be used. It is relatively inexpensive to provide material in this form and size for the purposes hereof.

With the device as shown in the drawing, it is clear that a sort of open loop device is provided and when it is gripped by the handle portion including the ends 2 and 3, as shown in the drawing, and striking a surface, whether it be the other hand of the person handling the device or some other surface, a loud sound is created and yet there is no real pain resulting therefrom.

Just what reason there is for this phenomenon is not exactly clear, but the fact is that a resulting sharp sound is of such a nature as to certainly obtain the attention of any animal for which the device is to be used for training purposes or for other reasons which may become apparent in dealing with an animal.

As a matter of fact even the striking action and the vigor with which the same is effected hardly results in any painful feeling at all, as will be evidenced from the fact that an individual holding the device in one hand and striking the other hand can just barely feel the effects of such striking action.

It is thus clear that even if an animal for example, or a child is struck by the device, pain will probably not result but certainly the attention will be obtained by the resulting sound created.

It should be understood that while the device is specified as being made from plastic material, it is within the purview of this invention to form the same from other materials which will have a similar result such as foam rubber or the like and even the necessity to form the same into a loop may be obviated if desired, for example by putting one or several strands or pieces of the material together along side and parallel so as to provide a handle section, and fastening them in that position, whereby striking a surface as described will create the effect heretofore described.

I claim:

1. A training device comprising a body formed of foam material adapted to impinge a surface by striking the same to create an attention getting sound, the body material is of predetermined length between the free ends thereof so as to be folded to bring the free ends into juxtaposition, and to form an open loop spaced from the ends, the free ends being joined together by connecting the same in parallel relation, a spacer member is positioned between the ends to provide a wide handle, the spacer having portions conforming to the portions of the body ends positioned therearound, and with those ends to form the aforesaid handle.

2. A device as claimed in claim 1, wherein the device is formed with an elongated, smooth, cylindrical body of closed cell, smooth skinned, plastic material.

3. A device as claimed in claim 1, wherein a smooth skin is formed integrally with the body which is cylindrical, and the sound is created upon striking the surface.

* * * * *